(12) United States Patent
Hukelmann

(10) Patent No.: US 10,973,249 B2
(45) Date of Patent: Apr. 13, 2021

(54) PRODUCTION PROCESS FOR ENCASED FOOD USING FILLING PIPE

(71) Applicant: Deutsches Institut fuer Lebensmitteltechnik e.V., Quakenbrueck (DE)

(72) Inventor: Bernhard Hukelmann, Quakenbrueck (DE)

(73) Assignee: Deutsches Institut für Lebensmitteltechnik e.V., Quakenbrueck (DE)

( * ) Notice: Subject to any disclaimer, the term of this patent is extended or adjusted under 35 U.S.C. 154(b) by 575 days.

(21) Appl. No.: 15/719,032

(22) Filed: Sep. 28, 2017

(65) Prior Publication Data
US 2018/0092388 A1    Apr. 5, 2018

(30) Foreign Application Priority Data

Oct. 5, 2016 (DE) .......................... 102016118850.6

(51) Int. Cl.
*A23P 30/20* (2016.01)
*A23L 13/60* (2016.01)
*A22C 13/00* (2006.01)

(52) U.S. Cl.
CPC .............. *A23L 13/62* (2016.08); *A22C 13/00* (2013.01); *A22C 13/0009* (2013.01); *A23P 30/20* (2016.08); *A23V 2002/00* (2013.01)

(58) Field of Classification Search
CPC ..... A23P 30/20; A22C 13/0009; A22C 13/00; A23L 13/62
USPC .......................................................... 426/105
See application file for complete search history.

(56) References Cited

U.S. PATENT DOCUMENTS 3,860,996 A * 1/1975 Kupcikevicius ....... A22C 11/02
452/35
4,466,465 A * 8/1984 Frey ................... A22C 11/0281
138/118.1

FOREIGN PATENT DOCUMENTS

DE    1951898    12/1966
WO    199222211   12/1992

* cited by examiner

*Primary Examiner* — Vera Stulii
(74) *Attorney, Agent, or Firm* — Greer, Burns & Crain, Ltd.; Steven P. Fallon

(57) ABSTRACT

The invention shows a food casing comprising a hose casing and cover plates terminally attached thereto in a liquid tight manner, which cover plates cover the terminal cross-sectional openings of the hose casing. At least one of the cover plates has a filling opening comprising a check valve, which is passable for food mass filled in the hose casing and blocks against the leakage of food mass out of the hose casing.

8 Claims, 2 Drawing Sheets

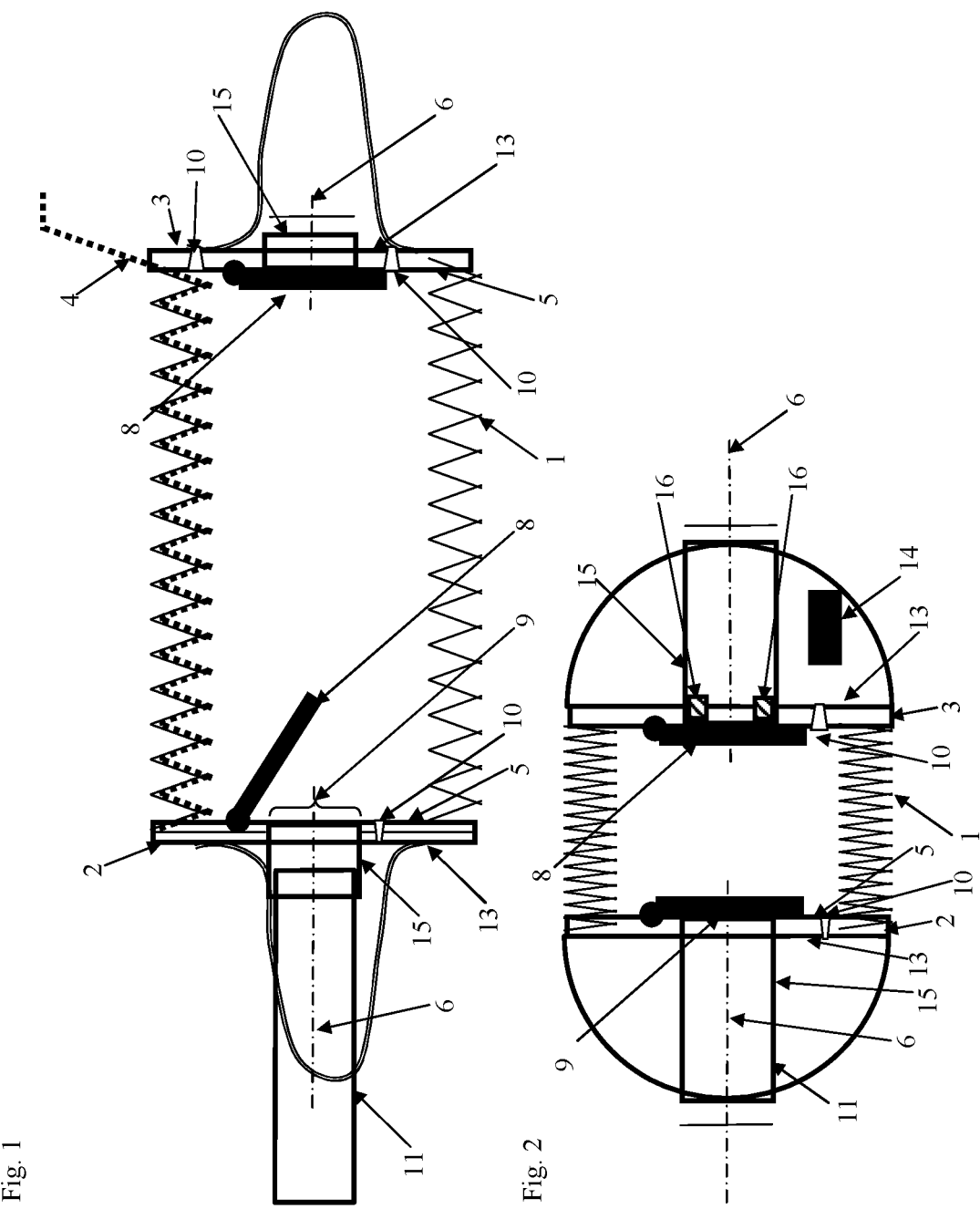

Figure 3:
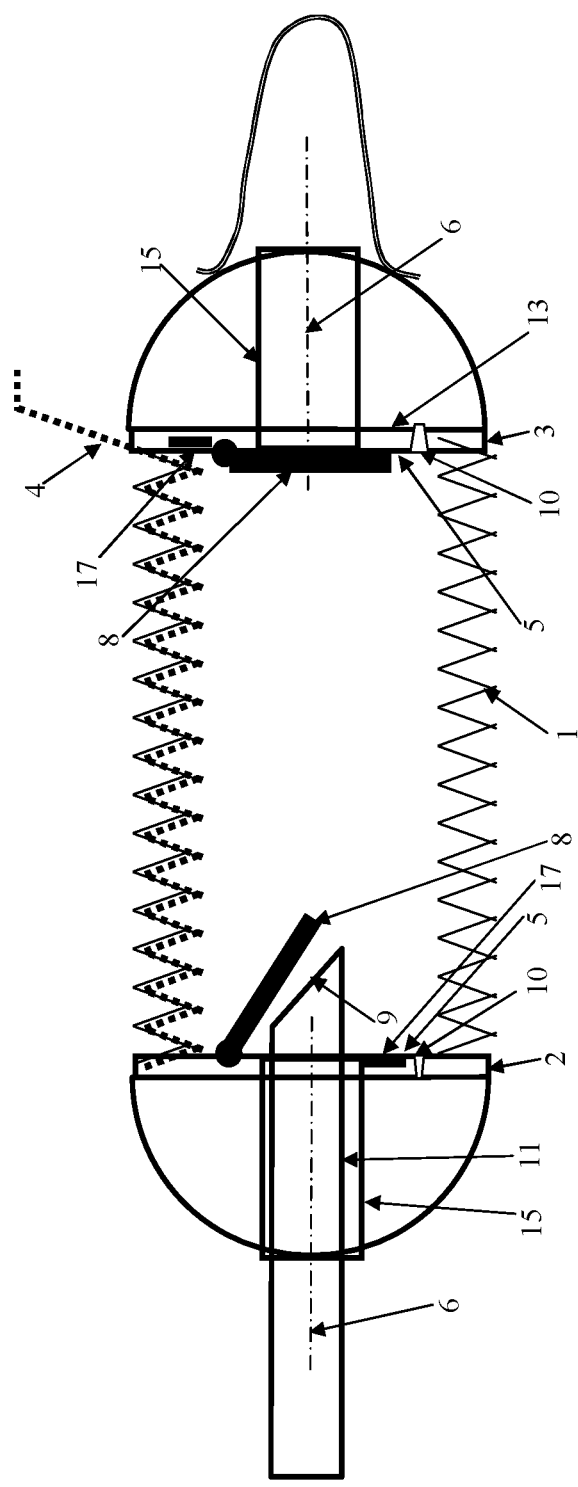

PRODUCTION PROCESS FOR ENCASED FOOD USING FILLING PIPE

This application claims the priority of the German patent application 10 2016 118 850, filed on Oct. 5, 2017.

The present invention relates to a food casing and a production process for food stuff encased by this casing, which food stuff has food masses filled in the food casing, which food masses preferably are pasty during filling and become sliceable in the food casing, for example by ripening and/or cooking, as well as to the use of the food casing as a casing for food stuff. The food casing comprises a casing in the form of a hose, which is tightened by being filled with food mass and is terminally closed. The food mass preferably is a protein-containing food mass, for example with or of sausage meat, vegetable components, egg and/or milk protein.

The food casing is characterized in that during filling with a food mass the food casing brings the food mass into a shape which is suitable for being cut into slices and, especially, facilitates holding a terminal cross-sectional area of the food stuff by means of a gripper and allows cutting into slices having an equal cross section while producing minor losses.

Hose casings for food stuff, which in the case of sausage are also designated as a gut, may be natural sausage casings or gut for the food casing according to the invention, preferably synthetic, on the basis of natural polymers, e.g. collagen, cellulose, especially skin fiber casings, e.g. Naturin, Kutisin or Elastin, or on the basis of cellulose and/or wood pulp, greaseproof paper, or silk matrix sausage casings. Alternatively, hose casings may be based on artificial polymers, e.g. polyolefins, polyurethan and/or mixtures, or stacked layers on the basis of natural and synthetic polymers.

STATE OF THE ART

Hose casings for food stuff are known to be filled with pasty food mass, for example by means of a pump, especially a screw-conveyor or an extruder, and to be closed subsequently terminally and in sections using attached clips or a cord.

Filled food casings, the ends of which are closed with an attached clip, are disadvantageous for being cut subsequently into slices of the same size due to the tapering ends of the food stuff. For holding the food stuff, it may be necessary to cut off a tapering end in order to produce a flat surface for attaching a gripper.

Problem of the Invention

The problem underlying the invention is the provision of an alternative food casing or an alternative food stuff encased by the food casing, and provision of a process for producing a food stuff encased by this food casing, the food casing being intended to be suitable to bring the food mass into a shape during filling with this mass which is suitable for cutting into slices with an equal surface while producing minor losses, and/or into a shape which facilitates holding the food stuff at a terminal cross-sectional area be means of a gripper.

DESCRIPTION OF THE INVENTION

The invention solves the problem by the features of the claims, especially by a food casing which comprises or consists of a hose casing and cover plates terminally attached thereto in a liquid tight manner, which cover the terminal cross-sectional openings of the hose casing. At least one of the cover plates has a filling opening comprising a check valve, which is passable for the food mass filled into the hose casing or is in an open position, and which blocks the leakage of food mass out of the hose casing, or is in block position.

The check valve may have at least one valve flap guided, for example hinged, on the cover plate, preferably at least two valve flaps, which completely cover the filling opening. The at least one valve flap may be formed as a check valve by resting on a section of the first surface of a cover plate and/or having an extension, which supports the valve flap in its block position on the wall of the filling opening. Alternatively, the check valve may be formed by at least one elastic valve flap, which covers the filling opening and under the pressure of filling forms at least one passage.

When being in block position, the check valve along with the cover plate preferably forms a flat first surface facing the internal volume of the hose casing. The second surface opposite the internal volume or opposite the first surface of the cover plate may form a plane, the cover plate between the first and second surface optionally having stiffening elements for the first surface. Each cover plate optionally may have an extension, which completes the cover plate towards its first surface in a tapering manner, for example covers the cover plate conically or in a dome-shape.

The cover plates may be attached to the ends of the hose casing in a liquid tight manner by being formed in one piece with the hose casing or by circumferentially encompassing the hose casing and being glued, welded and/or clamped to them, for example by being circumferentially glued, welded and/or clamped to the cover plates.

Each cover plate may by clamped to the hose casing by means of a clamping ring which, for example, pushes the hose casing circumferentially against the cover plate or into a circumferential groove of the cover plate.

The hose casing preferably is elastic, so that the same may be stretched by the food mass during filling, and after termination of the filling, for example by removing the filling pipe, the filled-in food mass pushes towards the filling opening.

By its first surface facing the internal volume of the hose casing, the cover plate of the food casing forms a matched surface of the adjacent food mass, which is flat and thus allows attaching or engaging a gripper after the cover plate has been removed, preferably the food casing, without further treatment, especially without cutting off a terminal section of the food stuff. This surface it flat, at least in the area of the cover plate, preferably flat in the area of the cover plate including the area of the check valve. Furthermore, after removing the cover plate, and preferably removing the food casing, the surface of the food stuff adjacent to a cover plate allows the cutting into slices having an equal cross section up to a short distance from a gripper lying against the surface.

Preferably, after the step of removing the cover plate, preferably removing the food casing, the production process comprises the step of cutting the food stuff into slices in parallel to a cover plate, especially in parallel to the first surface of the cover plate.

Preferably, the cover plates are attached to the hose casing in parallel to each other with their first surfaces, in order to be able to cut the food stuff formed therein in parallel to the first surfaces of the cover plates.

The cover plates may be arranged at an angle of from 30° to 90°, e.g. 45° to 75°, preferably perpendicularly to the longitudinal axis of the hose casing. Cover plates which are attached to the hose casing perpendicularly to the hose casing's longitudinal axis preferably are circular.

In the case of an arrangement of the cover plates at an angle of less than 90° relative to the longitudinal axis of the hose casing, the cover plates preferably are oval in order to be equal to the hose casing's cross section cut at this angle.

It is generally preferred that the hose casing is ruffled prior to filling, and furthermore preferably is additionally evacuated, so that the empty food casing is maintained stabile between the cover plates and is easy to handle, for example for being arranged on a filling device. Especially when the food casing is evacuated, the filling opening may be covered by an elastic material, for example by a diaphragm, which may be pierced prior to the filling by a filling pipe of a filling device. Optionally, a gap may be present between a check valve and the other cover plate, furthermore optionally, a spacer may be arranged between the cover plates in order to facilitate an opening of check valves during filling.

The cover plates may be of food safe plastic or of steel. After removing the cover plates or the complete food casing from a food stuff, for example before cutting, the process may contain the step of attaching the cover plates in each case terminally to a fresh hose casing, preferably after cleaning the cover plates, in order to form a fresh food casing. In doing so, it is preferred to clamp the cover plates with the fresh hose casing. In this embodiment, it is preferred that the cover plates are formed identically, so that the cover plates may be terminally attached to the hose casing without distinction.

Optionally, the cover plates may have through holes, which are gas permeable and are impermeable for the food mass filled in, for example through holes which become blocked by the food mass under filling pressure. Such through holes may have in the first surface, for example, a width of at maximum 0.5 mm, e.g. from 0.01 mm to 0.3 mm, and/or a cross section of from 0.01 $mm^2$ to 1 $mm^2$, preferably from 0.003 $mm^2$ to 0.25 $mm^2$, and, optionally, a length of from 0.1 mm to 15 mm through to the cover plate, optionally with a constant or tapering cross section. Alternatively, or additionally, through holes of the food casing may be formed in that at least one cover plate, preferably both cover plates, adjacent to the hose casing, for example along the circumference, have recesses which are covered by the hose casing along the circumference of the cover plate, but are not closed within the circumference of the cover plate. Such recesses may be arranged, for example radially, on the circumference of a cover plate. Recesses may be, for example, slit-shaped and opened towards the circumference of a cover plate, for example up to the circumference of a cover plate have a width of at maximum 0.5 mm, e.g. from 0.1 mm to 0.3 mm, and/or a cross section of from 0.1 $mm^2$ to 1 $mm^2$, preferably from 0.003 $mm^2$ to 0.25 $mm^2$. Compared to through holes, recesses being open towards the circumference of a cover plate are advantageous in that they allow easier cleaning.

An eyelet may be attached to at least one cover plate and be used to hang the food mass filled in the food casing.

Preferably, the hose casing has a longitudinal tear-off strip, which may be attached lineally or spirally to the longitudinal axis of the hose casing.

Optionally, at least one cover plate has an optically identifiable code and/or a writable electronic memory, preferably connected to at least one sensor, and/or an electronically readable memory for a stored code and/or for sensor data. The electronic memory may be, for example, an RFID memory. The sensor is, for example, a temperature sensor, a conductivity sensor having contacts in the first surface, or a pH sensor. In one cover plate a chemical or biochemical sensor, for example an indicator, may be inserted, for example as a sensor for the condition of the food stuff, for example for the degree of ripening or for the temperature.

Optionally, the cover plates may have contacts for the current supply, which lie in the first surface in order to apply electricity to the food mass, for example for generating pulsed electrical fields and/or for warming.

Optionally, the filled food casing may be treated by high pressure for preservation, for example for at least 3 or at least 5 min, for example for 3 to 10 min, at an excess pressure of at least 1,000 bar, preferably up to 12,000 bar, more preferably 6,000 to 8,000 bar. Devices suitable for such a static high-pressure treatment are available, i.a., from NC-Hyperbaric, Spain, which use, for example, water as a pressurizing medium.

The process comprises or consists of the following steps:
Arranging the food casing with the filling opening of the cover plate being adjacent to or around a filling pipe;
Filling a food mass into the hose casing through the filling pipe until the food casing is filled, especially until reaching a predetermined pressure or a predetermined volume, which was filled in or which occupies the food casing, and terminating the filling;
Wherein, optionally during the filling procedure, gas leaks out of the food casing via through holes of at least one of the cover plates;
Removing the cover plate from the filling pipe, wherein the food mass closes the check valve, for example shifts the at least one valve flap until being adjacent to the filling opening;
Optionally, incubating the filled food casing, for example for ripening and/or cooking of the food mass in the food casing;
Preferably, removing the cover plates or the complete food casing from the food stuff, for example by tearing a tear-off strip running on the food casing; and
Preferably, cutting the food stuff into slices, especially cutting in parallel to the surface of the food stuff, which was lying against a cover plate;
Optionally, cleaning and attaching the cover plates to a fresh hose casing for renewed filling.

Optionally, the food casing may be moved, for example rotated, around its longitudinal axis or perpendicularly to its longitudinal axis, after the filling, especially during a subsequent cooling phase, in order to achieve a distribution of ingredients of the food mass, which without movement settle during a cooling phase. This relates, for example, to food masses exhibiting a liquid phase during filling, which liquid phase is setting during a cooling phase, especially jelly, aspic or other liquid phases having a density different from chunky food ingredients contained therein.

The process does not contain a step of attaching a closure to the food casing, for example no attaching of a clip, a lacing or a lock seam. According to the invention, the closing of the food casing after the filling consists of the closing of the filling opening by means of the check valve.

In the process, the filling pipe may have an ending attached perpendicularly to the longitudinal axis or a beveled ending.

The food casing according to the invention may be arranged on a filling device by being positioned by an automated feeding system from a stock of the filling devices. The feeding system which, for example, may be a revolver system, is for example adapted to provide the filling device with one food casing each and to arrange the same with the filling opening to its filling pipe, when the previous food casing has been filled and removed from the filling device. In this respect, the food casing is advantageous insofar as the same may be completely prefabricated and readily be filled directly with food mass by pushing this mass through a filling pipe into the filling opening and the filling opening shuts automatically by means of the check valve after removal of the filling pipe. As a result of the automatic closure of the check valve loss of food mass is avoided, which otherwise would occur, for example by leakage of mass out of an open casing end.

Optionally, the surfaces of the check valves facing the internal volume of the food casing, which are arranged in the opposing cover plates, may lie against each other when the hose casing is ruffled, which preferably is evacuated, for example in order to cover the filling openings and to maintain the vacuum. In case of a check valve being present in only one cover plate, the surface of the check valve facing the internal volume of the hose casing may optionally lie against the opposing cover plate. In doing so, the cover plates preferably cover a greater proportion of the cross-sectional area of the hose casing than every check valve. In this embodiment, the check valves preferably project over the first surface of a cover plate facing the internal volume or are flush with this first surface.

Alternatively, in embodiments in which the food casing is ruffled and evacuated, the filling opening may be closed for maintaining the vacuum such that the edge of the filling opening adjacent to the check valve is connected circumferentially to the check valve in a tight and detachable manner. In this respect, this circumferential connection is detachable, for example in that the filling pipe disconnects this connection prior to the filling.

The invention shall now be described in more detail having reference to the figures, in which FIG. 1 schematically shows a food casing according to the invention during filling;

FIG. 2 schematically shows a further food casing according to the invention; and FIG. 3 schematically shows a further food casing according to the invention during filling.

Identical reference signs in the figures refer to functionally equal elements. In the figures, both cover plates 2, 3 have check valves 8 according to an embodiment of the invention.

FIG. 1 shows a food casing made of a hose casing 1, the terminal cross-sectional openings of which are closed by cover plates 2, 3, the hose casing 1 having a longitudinal tear-off strip 4. The cover plates 2, 3 with their first surfaces 5 facing the internal volume of the food casing are arranged perpendicularly to the longitudinal axis 6 of the hose casing 1. The cover plates 2, 3 each have an eyelet, from which the food casing may hang from after filling.

Each cover plate 2, 3 has a check valve 8 which covers the filling opening 9 and is formed as a non-return flap valve hinged on the cover plate 2, 3, and when being in block position fastens to the first surface 5, while being pivoted into the internal volume of the hole casing 1 into the open position during filling. The cover plates 2, 3 have through holes 10, which are impermeable for the food mass filled in or are blocked by the food mass. Such optional through holes 10 serve as an outlet of gas, for example air, which is contained in the food casing.

A filling pipe 11 lies against the filling opening 9 of a cover plate 3, in order to push a food mass through the filling opening 9 into the food casing. In the embodiment shown herein, the filling pipe 11 lies against a socket 15, which is attached to the cover plate 2, 3 opposite the first surface 5. The socket 15 may have an inner diameter smaller than the outer diameter of the filling pipe 11, so that the filling pipe 11 is unable to damage the check valve 8.

During this filling, the hose casing 1 stretches itself from the initial condition in which it is preferably ruffled. During the filling, gas contained in the food casing may leak out of the through holes 10.

FIG. 2 shows a food casing, the cover plates 2, 3 of which have in each case dome-shaped extensions on the second surface 13 opposite the first surface 5. The extensions may solidly join to the cover plates 2, 3, for example may be in one piece or be glued on or be welded on, preferably the extensions are bowl-shaped. In the embodiment shown herein, the filling openings 9 have a diameter equal to or larger than the outer diameter of the filling pipe 11. In this embodiment, the filling pipe 11 may be pushed into the filling opening 9 until being adjacent to the check valve 8, so that after disconnecting the filling pipe 11 from the cover plate 2, 3 only a minor proportion of food mass remains lost in the cover plate 2, 3.

Preferably, the filling pipe 11 and/or the cover plate 2, 3 has a mechanical stop 16 which restricts the pathway of the filling pipe 11 into the filling opening 9, for example until the filling pipe 11 is arranged directly on or at a minor distance on the check valve 8, for example at a minor distance of from 0.1 to 2 mm.

Prior to the filling the hose casing 1 preferably exists ruffled between its terminally arranged cover plates 2, 3. In the embodiment shown herein, the hose casing 1 has no tear-off strip.

A sensor 14 may be arranged on the cover plate 2, 3, which sensor is adapted to record the temperature, the electric conductivity, the pH value and/or a chemical or biochemical parameter of the food mass.

As shown in FIG. 2, an optically identifiable code and/or a writable electronic memory may be attached to a cover plate 2, 3, for example by means of an extension.

FIG. 3 shows a food casing during filling using a beveled filling pipe 11. The filling opening 9 has a diameter equal to or larger than the outer diameter of the filling pipe 11, so that the filling pipe 11 may be pushed forward into the internal volume of the hose casing 1 and lies against the check valve 8 formed as a flap valve in open position. For use with a beveled filling pipe 11 it is preferred, on the one hand, that the cover plate 2, 3, especially the filling opening 9 of which and/or the socket 15 of which and/or an optional extension, and, on the other hand, the filling pipe 11 or a mounting device for the food casing connected to the filling pipe 11 have asymmetric forms being compatible to each other, which allow the arrangement of the filling pipe 11 on and through the filling opening 9 only in one rotary position relative to the cover plate 2, 3 in order to adjust a predetermined rotary position of the filling pipe 11 relative to the check valve 8.

In embodiments in which the food casing is ruffled and evacuated, the filling openings may be covered, for example by an elastic material, which is arranged, for example on the second surface 13 of a cover plate 2, 3, or which is arranged at the end of a socket 15, which end lies opposite the check valve 8. Alternatively, in embodiments in which the food casing is ruffled and evacuated, the filling opening may generally be covered by that the check valve being detachably connected to the adjacent edge of the filling opening, for example is connected circumferentially to the filling opening in a tight manner, for example by means of a glued edge or is circumferentially welded on or formed on the filling opening, so that the circumferential connection of the check valve and the filling opening is disconnected by entry of the filling pipe.

Furthermore, FIG. 3 shows electric contacts 17, which are arranged in each cover plate 2, 3 in order to conduct electric current into the food mass.

REFERENCE SIGNS 1 hose casing
2 cover plate
3 cover plate
4 tear-off strip
5 first surface
6 longitudinal axis
8 check valve
9 filling opening
10 through hole
11 filling pipe
13 second surface
14 sensor
15 socket
16 mechanical stop

The invention claimed is:

1. A process for producing a food stuff by filling a hose casing with a food mass, in which the hose casing is closed on its terminal cross-sectional openings by one cover plate each, the first surface of which facing the internal volume of the hose casing is flat, wherein at least one cover plate has a filling opening covered by a check valve, and that a filling pipe is moved to or into the filling opening and the food mass is pushed through the filling pipe and subsequently the filling pipe is moved away from the cover plate and the check valve shuts.

2. The process according to claim 1, in which at least one cover plate has at least one through hole, which is gas permeable and impermeable for the food mass filled in and/or under the filling pressure is blocked by food mass and gas leaks through the through hole during the filling.

3. The process according to claim 1, in which the filled hose casing is ripened, cooled and/or cooked and subsequently the cover plates are removed and the food stuff is cut into slices in parallel to the surface of the food stuff, which was lying against a cover plate.

4. The process according to claim 1, in which the filled hose casing is ripened, cooled and/or cooked and subsequently the cover plates are removed and a gripper is arranged directly on the surface of the food stuff, which was lying against a cover plate.

5. The process according to claim 1, wherein the filled hose casing is treated for at least 0.5 min at an excess pressure of at least 1,000 bar.

6. The process according to claim 1, wherein the hose casing is ruffled and evacuated prior to the filling and that the filling opening is opened by the filling pipe prior to the food mass being pushed through the filling opening, wherein the filling opening is covered by an elastic material, which is pierced by the filling pipe, or that the filling opening is covered in that it is connected circumferentially along its edge to the check valve in a tight manner and this connection is disconnected by the filling pipe, or that the filling opening is covered by the check valve lying against a check valve of the opposite cover plate or against the opposite cover plate.

7. The process according to claim 5, wherein the excess pressure is up to 12,000 bar.

8. The process according to claim 7, wherein the excess pressure is 5,000 to 8,000 bar.

* * * * *